United States Patent [19]
Schlafly

[11] Patent Number: 5,274,707
[45] Date of Patent: Dec. 28, 1993

[54] MODULAR EXPONENTIATION AND REDUCTION DEVICE AND METHOD

[76] Inventor: Roger Schlafly, P.O. Box 1680, Soquel, Calif. 95073

[21] Appl. No.: 804,850

[22] Filed: Dec. 6, 1991

[51] Int. Cl.$^5$ ............................................. H04K 1/00
[52] U.S. Cl. ...................................... 380/30; 380/28; 380/50
[58] Field of Search .................. 380/23, 28, 30, 49, 380/50; 364/754, 753, 758, 759

[56] References Cited

U.S. PATENT DOCUMENTS

| | | | |
|---|---|---|---|
| 4,027,147 | 5/1977 | Majos et al. | 364/759 |
| 4,594,678 | 6/1986 | Uhlenhoff | 364/758 X |
| 4,736,423 | 4/1988 | Matyas | 380/30 X |
| 4,870,681 | 9/1989 | Sedlak | 380/30 |
| 4,891,781 | 1/1990 | Omura | 380/30 X |
| 5,073,870 | 12/1991 | Morita | 364/754 X |
| 5,121,429 | 6/1992 | Guppy et al. | 380/30 |
| 5,159,632 | 10/1992 | Crandall | 380/30 X |
| 5,166,978 | 11/1992 | Quisquater | 380/30 |

OTHER PUBLICATIONS

J. Nehvatal; "Computer Security, Public-key Cryptography"; NIST Special Publication 800-2, U.S. Printing Office, Apr. 1991.

"The art of Computer Programming"; vol. 2, Seminumerical Algorithms; Donald Knuth; Addison-Wesley, 1981.

"Optimized Software Implementations of the Modular Exponentiation on General Purpose Microprocessors"; D. Bong et al; Computer & Security vol. 8, 1989.

Primary Examiner—Tod R. Swann

[57] ABSTRACT

A device for applying modular arithmetic exponentiation and reduction to an input message, and method. The device includes a partial array multiplier and an array subtracter, but requires no divider unless the modulus is changed. The intermediate results are only approximate but a correction technique makes the output signal exact.

24 Claims, 2 Drawing Sheets

MODULAR EXPONENTIATION AND REDUCTION DEVICE AND METHOD

BACKGROUND

This invention relates to devices handling integer arithmetic, specifically to the exponentiation and modular reduction of large integers.

Modular reduction is closely related to division. Suppose N and P are positive integers. Then long division as taught in elementary school gives a quotient Q and remainder R. These are the unique nonnegative integers satisfying, $$N = QP + R$$

$$R < P$$

For example, if N=25 and P=7 then Q=3 and R=4. This is the computation that one does to deduce that 25/7=3 4/7. In this context, P is also called the modulus, and N is said to be reduced to the residue R.

Exponentiation is the operation of raising a number (called the base) to a power. The base is multiplied by itself some number of times, that number being called the exponent. For example, 5 raised to the 2-nd power is $5^2 = 5 \cdot 5 = 25$ and 5 raised to the 6-th power is $5^6 = 5 \cdot 5 \cdot 5 \cdot 5 \cdot 5 \cdot 5 = 15625$. Modular exponentiation combines raising to a power with with modular reduction. For example, $5^2$ reduced with modulus 7 is 4.

In certain applications such as cryptography, the number P is a very large integer and these exponentiations and reductions must be applied to other large integers. Such large integers may have hundreds of decimal digits. See for example reference 7 for the utility of such computations. In that context, the inputs are usually messages or cryptographic keys. Since any digital input signal may be regarded as a large integer, the description of this invention refers to the inputs as integers.

Large integers are ordinarily stored in an array of registers, and in binary form. The registers may be visualized sequentially as one gigantic binary integer, with the register at one end being the most significant part, and the register at the other end being the least significant. For example, the number 1234 has 1 as its most significant digit, and 4 as its least significant digit. If a register holds one decimal digit, then the number could be stored in an array of four registers.

Operations are performed by a central processing unit, which usually has an adder, a subtracter, a multiplier, and sometimes a divider. Each such unit can only perform an operation on a quantity if it fits into a register. There is also some mechanism for handling a carry, the result of an arithmetic overflow in an add or a subtract. The result of a multiply ordinarily requires two registers, and does not involve a carry.

It is well known how to build an array adder or an array subtracter. The array adder adds each register of one input with the corresponding register of the other, starting with the least significant register. The overflow, or carry, in incorporated in to the next add. An array subtracter is similar, with the carry sometimes called a borrow in this context. See reference 8 for details. It has a thorough exposition of the prior art relating to the subject of this invention.

An array multiplier can be built from multipliers and adders. Such a device can multiply two register arrays, putting the product in a third register array. In the prior art, this is usually done with a multiplier and an adder with carry. The output register array is initialized with zeros, and acts as an accumulator. The multiplier scans each register of each input, computing products. The products are added to the output register array, with carries propagated accordingly.

Reference 8 presents an alternative array multiplier. Each product is computed in two registers. Only one is added into the output array, with the carry incorporated back into the other register. That latter register is kept with the multiplier so it can be either incorporated into the next product or later added into the output. This array multiplier is an improvement in that it avoids carry propagation, but requires a more complex multiplier having an extra register.

When multiplying fractional quantities, reference 8 suggests discarding some of the products to give an approximate answer. However the method is not recommended for use when multiplying integers, because on rare occasions a lost carry can make all of the digits in the answer wrong if even just one product is omitted. Integer arithmetic normally requires all digits to be correct.

In the prior art, modular reduction is performed by a divider, if the value fits in a register. A divider typically uses repeated subtractions. While some dividers are very clever and efficient, they are slower than multipliers.

Modular reduction of larger integers is performed by a array divider, which often operates by repeated subtraction. If a register divider is available, then an improved method is available, and is described in reference 8. It is similar to long division as taught in elementary school, and consists of repeated divisions, multiplications, and subtractions.

For very large integers (thousands or more decimal digits), reference 2 gives more efficient methods for computing products and inverses. These use approximate inverses in the context of Fourier transform multipliers, but not in conjunction with the type of array multipliers used in this invention.

Modular exponentiation appears extraordinarily complex, but there are a couple of standard tricks which dramatically simplify the process. These tricks are to use repeated squaring and to reduce after each multiply. If, for example, the modulus is 7, then $5^6$ could be reduced by calculating $5^6 = 15625$, and dividing by 7 to get 2232 1/7, so the residue is 1. With much larger numbers, such a direct calculation is impractical. The clever method is to repeatedly square 5. $5^2 = 25$ has residue 4. Squaring again, $5^4 = (5^2)^2$ has the same residue as $4^2 = 16$, which is 2 since 16/7=2 2/7. Thus $5^6 = 5^4 \cdot 5^2$ has the same residue as 2·4=8, ie, 1.

The method of modular exponentiation used is this example is perfectly general, and widely used. The binary representation of the exponent is precisely the recipe for deciding which squares must be multiplied together. A modular reduction at each stage prevents the numbers from getting too large. A modular exponentiation device can be built out of a modular reduction device, an array shifter, and an array multiplier. The array multiplier repeatedly squares the base. The array shifter repeatedly examines the bits in the exponent, one at a time, and conditionally signals the array multiplier to do another product. The modular reduction device is applied to the result of each multiply. The method is quite efficient, but this invention provides an improvement.

In the prior art, there are various methods for organizing the sequence of powers in a manner which reduces the number of multiplications. One method is to store the repeated squarings of the base in a table. For example, if powers of 5 are needed, then $5^2, 5^4, 5^8, \ldots$ can be stored in a table. Another method is to use the ternary (rather than binary) expansion of the exponent. Other number representations are also possible. For details, see Knuth, reference 8.

SUMMARY

Accordingly, it is an object of this invention to provide a system and method for very efficient modular exponentiations and reductions of large integers.

It is another object of this invention to provide a device and method for implementing digital signatures and related public key cryptographic message transformations for public key cryptosystems of modular exponential type.

Accordingly, an efficient method for modular arithmetic exponentiation and reduction is described below. The chief advantages of this invention are that it (a) can handle extremely large integers.
(b) has very few components, mainly a partial array multiplier, an array shifter, and an array subtracter.
(c) does not require a divider, once the modulus is fixed.
(d) is extremely fast, faster than the prior art.

Much of the speed and novelty comes from the clever approximations used at each step. Nevertheless, the final output is completely exact and precise.

The device is suitable for use in cryptographic applications, where signals represent messages on communications channels and must be processed quickly and cheaply. It can be effectively built as a custom integrated circuit or emulated in software on a convention computer processor.

DETAILED DESCRIPTION OF THE INVENTION

Figure 1:
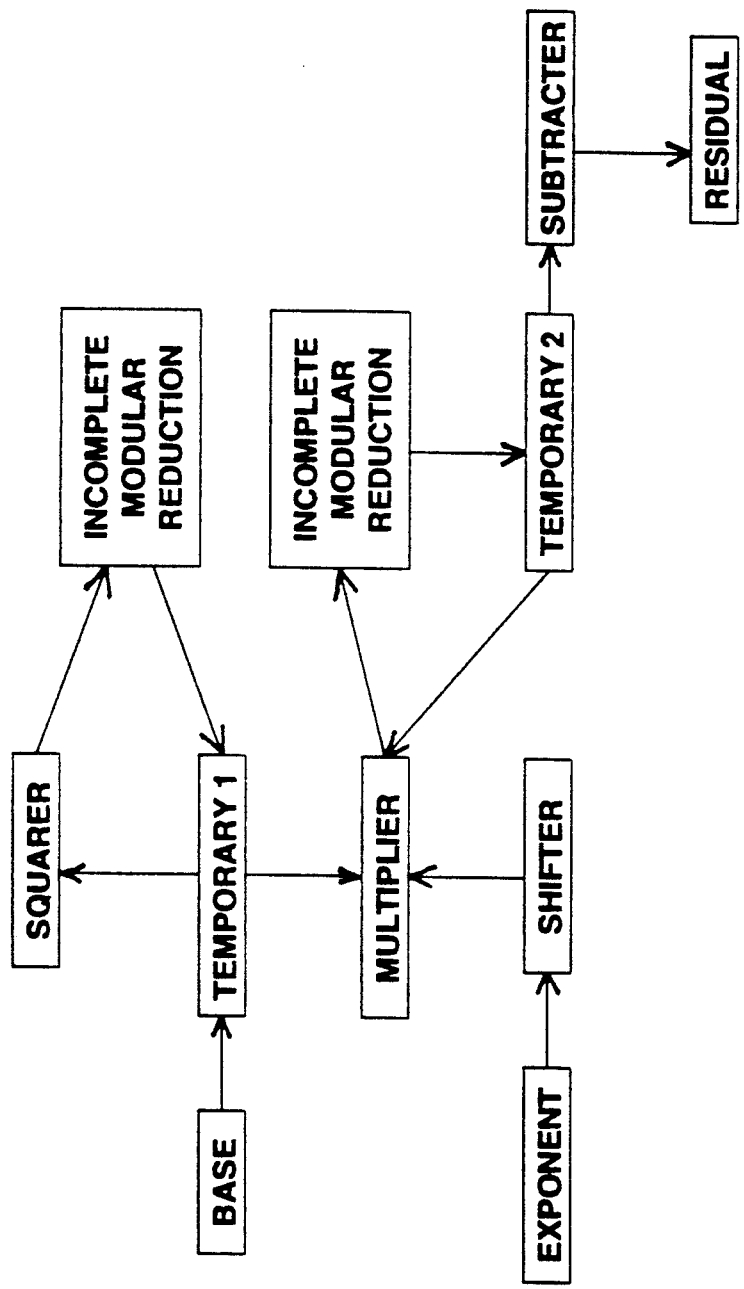
FIG. 1 shows an embodiment of the modular exponentiation device. The input is the base and exponent and the output is the residual. The modulus and the approximate modulus inverse are implicit in the incomplete modular reduction box.

This invention does very efficient modular exponentiations and reductions for particular values of the modulus P. It uses only a partial array multiplier, an array subtracter, and some precomputed data which depends on P. It does not require a divider.

The input to the device is the integer N, stored temporarily in an array of registers. Other arrays of registers are available for intermediate results, and for the final result.

The partial array multiplier is similar to an array multiplier, except that only selected register products are accumulated into the result. Depending on which products are chosen, it can produce the exact product array or an approximation. Several choices are used in this invention. By only accumulating the products going into the least significant half of the output, that part can be calculated without doing the most significant half. Also, the most significant half of the output can be approximated by only accumulating the products going into that part. In the latter case, the approximation is not exact because it ignores some carries. However the effect of these carries is sufficiently small that the final output will still be exactly correct.

The main novelty of this invention is in avoiding a divider and in using approximations to get exact results. The first approximation is to the inverse T of P. The inverse is a number T, usually stored in a register array, which when multiplied by P gives a number close to a power of two, or of whatever radix is in use. (The examples below use radix ten, for the convenience of ordinary decimal notation.) The number of registers needed for T is about the same as P, but might be one more or less depending on particular properties of P. Such an inverse may be computed with an array divider external to this invention.

The second approximation is to the quotient Q. It is obtained by applying the partial array multiplier to N and T, saving only the most significant half of the product.

The third approximation is to the residue R. It is obtained by applying the partial array multiplier to Q and P, saving only the least significant half, and then subtracting it from the corresponding registers of N.

Such a process of calculating an approximate residue is called incomplete modular reduction. The approximate residue may not be equal to the true residue, but the true residue can be deduced from it by doing a modular reduction.

Deriving the residue from the incomplete modular reduction of this invention can be done in one simple step. The step is to subtract P from the approximate residue. If nonnegative, it is the correct residue. Otherwise, the difference just computed is the correct residue.

Here is a simple example. To make understanding easier, the example uses decimal notation. Suppose the modulus P is 7. The reciprocal $1/7 = 142857\ldots$ can be truncated to give the inverse $T=14$. Then $PT=98$, nearly a power of 10. Given an input $N=25$, the approximation to the quotient is calculated from NT. The NT product calculation is:

$$NT = 25 \cdot 14 = (20 + 5)(10 + 4)$$
$$= 200 + 80 + 50 + 20 = 350$$

Doing the partial array product omits the last term and gives 330. Only the first digit is significant, so the quotient approximation is $Q=3$. For the residue, look at $N-P=25-3\cdot 7=4$. Subtracting $P=7$ from 4 would be negative, so $R=4$ is the correct residue.

This method usually gets the quotient exactly right, but sometimes it is off by one and has to be corrected. For example, if the input N is 29 then $NT=406$ but the partial product is 370 given $Q=3$. The residue gets calculated as $N-QP=29-3\cdot 7=8$. Subtracting $P=7$ gives 1, so 1 is accepted as the correct residue. The subtraction reflects the fact that the true quotient is 4, not 3.

An example with larger numbers better illustrates the use of register arrays. Imagine that each register holds one decimal digit. Suppose the modulus P is 173. The reciprocal $1/173 = 0.00578034682\ldots$ can be truncated to give T=5780. By luck, the last digit is zero, so it is simpler to use T=578. (In these examples, the placement of the decimal point can be confusing. I am moving it around arbitrarily so that the arithmetic is in terms of integers.) Then PT=99994, nearly a power of 10. Given an input N=23456, the approximation to the quotient is calculated from NT. The full product, calculated by multiplying each digit of N by each digit of T is:

```
      23456
    ×   578
    ------
         48
        40
        32
        24
        16
        42
        35
        28
        21
        14
        30
        25
        20
        15
        10
    --------
    13557568
```

On the other hand, the partial array multiplier skips a lot of these terms. Only the first three digits of the product are significant, so it only uses those terms likely to affect the first three digits. The partial array product os computed as follows:

```
      23456
    ×   578
    ------
         24
         16
         28
         21
         14
         20
         15
         10
    --------
    13522000
```

Computing the partial array product in this way saves about half the multiplies in this case, and still gives Q=135 as the approximate quotient. Calculating the residue requires the product QP.

```
        135
    ×   173
    ------
         15
         09
         03
         35
         21
         07
         05
         03
         01
    ------
    023355
```

Again, some of these products are unnecessary. The product will be subtracted from N to give a 3-digit number, so one can anticipate that the product will be of the form 023???. Hence the partial array multiplier only calculates the terms necessary to get the last 3 digits correct:

```
        135
    ×   173
    ------
         15
         09
         03
         35
         21
         05
    ------
    003355
```

003355 would seem like a poor approximation for the true product 023355, but at least the last three digits are correct. (Actually four in this case, but only three matter.) Subtracting the partial product from N gives 20101. Only the last three digits are meaningful, so the others are discarded, giving a residue R=101. Subtracting P gives a negative number, so 101 is the correct residue.

In the preferred embodiment, the numbers are represented in binary notation with 32 or 64 bits per register, but the ideas are the same.

The construction of the partial array multiplier out of register multipliers and adders is straightforward except for one clever trick. The output of each multiplier is in two registers (the high and low parts of the product), which are then added to the appropriate registers in the output accumulator array. In case of an arithmetic overflow, a carry bit is generated. Instead of adding the carry to the output array where it might generate another annoying carry, it is retained in the multiplier. Each multiply adds the carry bit to the high part of the product. It can be shown that this addition never causes an arithmetic overflow.

To make this multiply with carry work, the order of the multiplies matters. The order illustrated in the above examples will work fine, provided that the carry is discarded in a couple of key places, such as at the beginning.

Consider the above example of the partial product of 23456 with 578. Initially, the register array accumulator is cleared to 00000000, and the carry in the multiplier is also cleared. Adding the 24 gives 00024000 and adding the 16 gives 00184000. Next the 28 is added to the 84 giving 00112000 and a carry. The next product 21 has the carry added to make it 31, and adding it gives 00422000. Adding 14 gives 01822000 with no carry. Adding 20 gives 01022000 and a carry which makes the next product 15 into a 25. Adding the 25 gives 0352200, and adding the 10 gives 1352200.

The preferred embodiment of the partial array multiplier uses a multiplier with carry, and an adder. Other embodiments may use a multiplier and an adder with carry. Still other embodiments may use several multipliers and/or several adders, acting in parallel.

The preferred embodiment of the modular reduction device uses an the approximate inverse T which has been truncated, meaning it is less than the true inverse. Multiplying by P gives a number slightly less than a power of the radix. This assures that the approximate quotient will not be larger than the true quotient, and that the subsequent subtraction gives a nonnegative approximate residue. Another embodiment may output a negative residue, or adjust a negative result by adding P.

Other embodiments may also use an array shifter. An array shifter operates by repeated use of a register shifter with carry. Conceptually, a shift just multiplies or divides by the radix and may be visualized as moving all the bits to the right or left. The usefulness of the shifter is that it may be convenient to align the inverse or other intermediate quantities in a different way.

The preferred embodiment stores the input, output, and intermediate quantities as arrays. Alternative embodiments may use other data structures, such as linked lists.

MODULAR EXPONENTIATION

Modular reduction is one component of the modular exponentiation device in this invention. The modular exponentiation device uses the method of squaring, shifting, multiplying, and modular reduction, but with crucial improvements. The main improvement is that it uses incomplete modular reduction instead of modular reduction in each stage.

The final stage uses an incomplete modular reduction, and hence may not give a residue smaller than the modulus, as required. Hence the invention uses one more step, a modular reduction, to output the true residue. With the preferred embodiment of incomplete modular reduction, as explained above, determining the final modular reduction requires just one array subtraction.

For example, suppose the modulus is 7 and $5^6$ is to be reduced as in the above example. Suppose an incomplete modular reduction device is available, which acts as a black box and always delivers a one-digit result. As before, $5^2=25$ reduces to 4, and $4^2=16$ reduces to 2 or 9; suppose the box gives 9. Then the residue is given by reducing $4 \cdot 9 = 36$ and the box gives 1 or 8. Subtracting 7 assures a complete modular reduction. If the box gives 8, subtracting 7 gives a residue of 1. If the box gives 1, subtracting 7 gives a negative number, so the 1 must have already been fully reduced.

In the preferred embodiment, the incomplete modular reduction is computed with the method of this invention, and the true residue is obtained with an array subtracter as described above. Such a modular exponentiation device is shown in FIG. 1, in block diagram form. There are two temporary register arrays, one ("temporary 1") to hold the result of repeatedly squaring the base, and the other ("temporary 2") to hold the product of certain of those squares. Each undergoes incomplete modular reduction whenever a multiply takes place.

The logic of FIG. 1 is driven by the shifter. Temporary 1 is squared for each bit in the exponent, but a multiply of temporary 1 into temporary 2 is performed only when that bit is one. When the shifter exhausts the bits of the exponent, the subtracter subtracts the modulus (if necessary) to complete the modular reduction.

An alternate embodiment may use (complete) modular reduction in the final stage instead of incomplete modular reduction, thereby avoiding the need for a subsequent correction.

The advantage to using incomplete modular reduction is that it can be done more quickly. The drawback is that it may give you a larger number, and a larger number may take more time in a subsequent multiplication. However, an efficient incomplete modular reduction, like the one in this invention, will give the true residue in the vast majority of cases, and will be only slightly larger than the modulus in the remaining cases.

In the preferred embodiment, the squaring is done with a modified partial array multiplier. As with other partial array multipliers, only some of the register products are calculated, but certain of those are doubled.

This is best illustrated with an example. Squaring 567 with all products calculated can be written as follows.

```
      567
    x 567
      ───
       49
       42
       35
       42
       36
       30
       35
       30
       25
      ─────
    321489
```

Note that 42, 35, and 30 each occur twice in the same column where they occur. The modified partial array multiplier just computes these once, and then doubles them before adding them into the total. Doubling is much more efficient than multiplying if binary representation is in use. For a large number to be squared, this is a substantial saving, as only slightly more than half of the register multiplies are necessary.

As described above, the modulus inverse used in this invention may be calculated by an external array divider. An alternate embodiment has a built-in inverter, a device for computing the approximate inverse. The preferred implementation of such an inverter uses Newton's method. The object is to calculate the quotient K/P, where K is a power of the radix. The method consists of iterating the transformation $$X \rightarrow 2X - PX^2/K$$

Again, the only components needed are a partial array multiplier, an array shifter, and an array subtracter. The division is by a power of the radix, so it can be done with a simple shifter.

As an example of the steps used by such an inverter, consider the inverse to 173 used above. Taking $K=10000$ gives a four-digit inverse. Starting with 5000 as a first guess, the next approximation is $2 \cdot 5000 - 173 \cdot 5000 \cdot 5000/1000000 = 5675$. Another iteration gives 5779, which is quite close to the more accurate answer used above, 5780.

There are some tricks to choosing an initial guess, but they are not material to this invention. Any guess will do, although a poor guess will require more iterations. Of greater importance is determining convergence and the accuracy of the final digit. Again, several methods are available, including computing a couple of extra digits or carefully monitoring the remainder in the iteration formula. At any rate, X will equal the quotient K/P if it satisfies the relation $0 \leq K - XP < K$.

In the preferred embodiment of the inverter, the squaring in Newton's method is done with a modified partial array multiplier as explained above, and the other multiply is done with a partial array multiplier which retains the most significant part of the product. Additionally, some of the registers in the register array which are known to be inaccurate can be ignored, thereby avoiding some more multiplies. If the numbers are binary, the multiplication by two can be done by the array shifter.

Another embodiment might just use a (full) array multiplier for all of the multiplies in the inverter.

Figure 2:
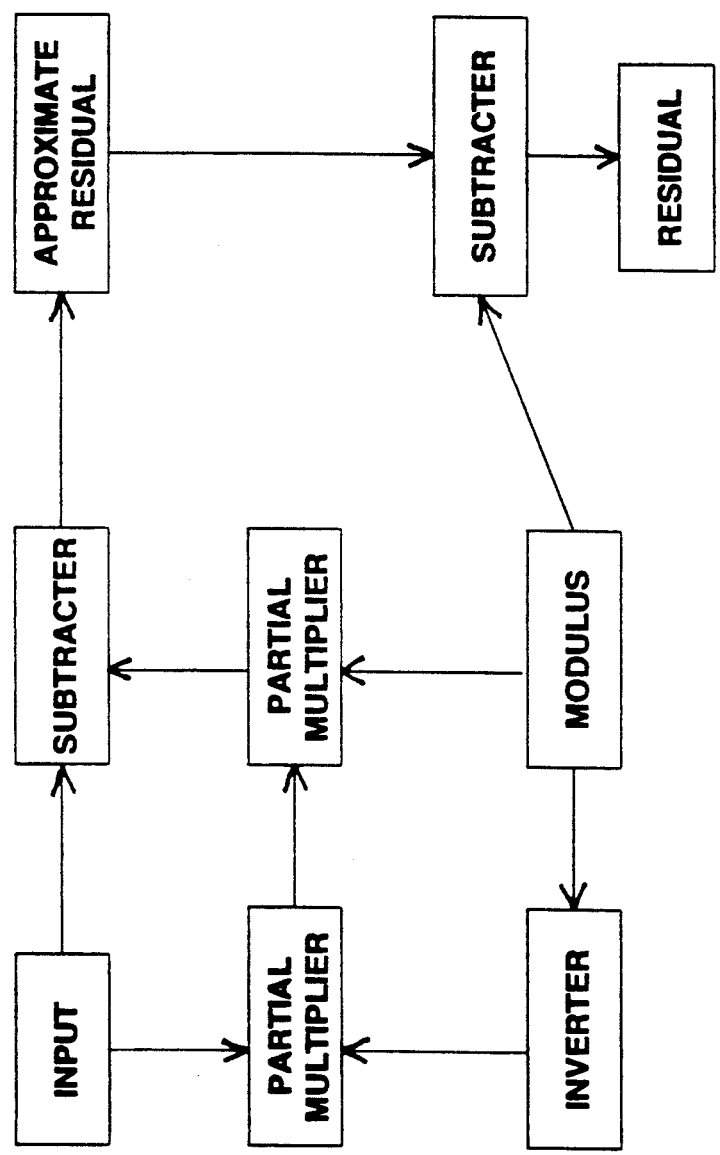
FIG. 2 shows an embodiment of the modular reduction device, in conjunction with an inverter. If the approximate residual is used as the output, then it is an incomplete modular reduction device.

FIG. 2 shows the preferred embodiment of the modular reduction device, in conjunction with an inverter. Only the portion which produces the approximate residual is needed for the preferred embodiment of the modular exponentiation device. Only the output of the inverter is needed, and that inverse can be computed in advance of the modular exponentiation.

The accompanying figures for this invention show partial array multipliers and array subtracters occurring more than once. The preferred embodiment actually just has one of each, and is wired so each can be used in more than one context. That way, a modular reduction device can be built with just two major components. Another embodiment might duplicate one or both of these components.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a public key cryptosystem of modular exponential type, a method for processing cryptographic variables comprising the steps of
   transforming said cryptographic variables into large integers,
   using one of said integers as the modulus,
   using an approximate inverse to said modulus,
   using the method of repeated squaring, shifting, and multiplying for computing an exponential,
   incomplete modular reducing at each stage to generate an approximate residue,
   using an array subtracter to generate a final residue from said modulus and said approximate residue, and
   transforming said final residue into an output cryptographic variable.

2. The method of claim 1 wherein squaring is performed by a partial array multiplier and by doubling certain terms.

3. The method of claim 1 further comprising reducing the number of multiplications and modular reductions by using selected precomputed powers.

4. The method of claim 1 further comprising transforming said modulus into said approximate modulus inverse.

5. The method of claim 1 further comprising inverting using Newton's method.

6. The method of claim 1 further comprising generating digital signatures, authentications, or related public key signals.

7. In a public key cryptosystem of modular exponential type, a method for processing cryptographic variables comprising the steps of
   transforming said cryptographic variables into large integers,
   multiplying said large integers to yield an even larger integer,
   using another said large integer as a modulus,
   having a precomputed approximate modulus inverse to said modulus,
   performing an incomplete modular reduction on said larger integer by using a partial array multiplier to generate an approximate quotient from an input signal and said modulus inverse, and using a partial array multiplier and an array subtracter to generate an approximate residue from said modulus, said input, and said approximate quotient.

8. The method of claim 7 wherein using an array subtracter to generate an exact residue from said modulus and said approximate residue.

9. The method of claim 7 wherein said method uses shifting to align intermediate quantities.

10. The method of claim 7 wherein said precomputed approximate modulus inverse has been truncated based on the favorable position of zeros.

11. The method of claim 7 wherein said method uses full array multiplying instead of partial array multiplying.

12. The method of claim 7 wherein using said modular reducing for public key encrypting and decrypting.

13. The method of claim 7 further comprising generating digital signatures, authentications, or related public key signals.

14. Apparatus for processing an ordinary digital signal comprising
   means for representing said digital signal inputs as large integers stored in register arrays,
   one or more register adder circuits,
   one or more register subtracter circuits,
   one or more register multiplier circuits,
   one or more partial array multipliers using said multiplier circuit(s) and said adder circuit(s),
   one or more array subtracters using said subtracter circuit(s),
   having a precomputed approximate modulus inverse,
   means for multiplying two of said large integers,
   means for incomplete modular reduction using said partial array multiplier and said array subtracter,
   means for modular exponentiation using said partial array multiplier, said incomplete modular reduction, and said array subtracter, and
   means for representing output large integer as a digital signal.

15. The apparatus of claim 14 wherein several of said register adders, subtracters, and multipliers act in parallel.

16. The apparatus of claim 14 further comprising the means to use selected precomputed powers to reduce the number of multiplications and modular reductions.

17. The apparatus of claim 14 further comprising the means to transform an input modulus into said approximate modulus inverse.

18. The apparatus of claim 14 implemented as a custom or semi-custom integrated circuit.

19. System for incomplete modular reduction of cryptographic variables, comprising
   a large integer as a modulus,
   a precomputed approximate modulus inverse to said modulus,
   a partial array multiplier to generate an approximate quotient from one of said cryptographic variables and said modulus inverse, and
   a partial array multiplier and an array subtracter to generate an approximate residue from said modulus, an input, and said approximate quotient.

20. The system of claim 19 further comprising
   means to accept the modulus as an input, and
   means to transform said modulus into said approximate modulus inverse.

21. The system of claim 19 further comprising means to convert said approximate residue to an exact residue.

22. The system of claim 19 wherein said system is a modular reduction stage in a public key cryptosystem of modular exponential type.

23. The system of claim 19 wherein said system is used to generate digital signatures, authentications, or related public key signals.

24. A partial array multiplier, comprising
registers for storing inputs,
means for storing a carry bit, initially zero,
means for multiplying two registers and putting the product in two output registers,
means for adding said carry bit to the more significant of said output registers, and
an adder which stores resultant carry in said carry bit storage.

* * * * *